(12) United States Patent
Bois et al.

(10) Patent No.: US 10,569,214 B2
(45) Date of Patent: Feb. 25, 2020

(54) ACTIVE ELEMENT, METHOD FOR MANUFACTURING THE SAME AND CONTAINER WITH ACTIVE ELEMENT

(71) Applicant: CLARIANT PRODUCTION (FRANCE) S.A.S., Choisy le Roi (FR)

(72) Inventors: Dominique Bois, Montreuil aux Lions (FR); Valere Logel, Levallois Perret (FR)

(73) Assignee: CLARIANT PRODUCTION (FRANCE) S.A.S., Choisy le Roi (FR)

(*) Notice: Subject to any disclaimer, the term of this patent is extended or adjusted under 35 U.S.C. 154(b) by 444 days.

(21) Appl. No.: 15/109,711

(22) PCT Filed: Dec. 19, 2014

(86) PCT No.: PCT/EP2014/078748
§ 371 (c)(1),
(2) Date: Jul. 5, 2016

(87) PCT Pub. No.: WO2015/104175
PCT Pub. Date: Jul. 16, 2015

(65) Prior Publication Data
US 2016/0325221 A1    Nov. 10, 2016

(30) Foreign Application Priority Data
Jan. 8, 2014   (EP) .................................. 14305020

(51) Int. Cl.
*B65D 81/26*    (2006.01)
*B01D 53/04*    (2006.01)
(Continued)

(52) U.S. Cl.
CPC ........... *B01D 53/04* (2013.01); *B01D 53/261* (2013.01); *B01J 20/0229* (2013.01);
(Continued)

(58) Field of Classification Search
CPC .. B65D 81/264; B65D 81/266; B65D 81/268; B01D 53/02; B01D 53/04; B01D 53/263;
(Continued)

(56) References Cited

U.S. PATENT DOCUMENTS 2,212,932 A * 8/1940 Fairlie ...................... B01J 19/30
                                                      165/179
3,633,538 A * 1/1972 Hoeflin .................. D06M 23/02
                                                       118/76
(Continued)

FOREIGN PATENT DOCUMENTS

EP      0 393 964 A2    10/1990
FR      1405374 A        7/1965
(Continued)

OTHER PUBLICATIONS

Extended European Search Report dated Aug. 26, 2014 with respect to European Patent Application No. 14305020.1.
(Continued)

*Primary Examiner* — Luan K Bui
(74) *Attorney, Agent, or Firm* — Scott R. Cox (57) ABSTRACT

An active element for trapping and/or releasing a gaseous or liquid substance is provided including a solid body, which is enveloped by an outer boundary surface (S), and contains an active material adapted to trap and/or release a gaseous or liquid substance, wherein the outer boundary surface S has an overall roundish, preferably round shape. The active element is manufactured by injection moulding and can be utilized within a container.

19 Claims, 4 Drawing Sheets

(51) Int. Cl.
   *B01D 53/26* (2006.01)
   *B01J 20/28* (2006.01)
   *B01J 20/12* (2006.01)
   *B01J 20/18* (2006.01)
   *B01J 20/10* (2006.01)
   *B01J 20/02* (2006.01)
   *B01J 20/26* (2006.01)
   *B65D 41/02* (2006.01)

(52) U.S. Cl.
   CPC ............ *B01J 20/103* (2013.01); *B01J 20/12* (2013.01); *B01J 20/18* (2013.01); *B01J 20/261* (2013.01); *B01J 20/2805* (2013.01); *B01J 20/28042* (2013.01); *B65D 41/02* (2013.01); *B65D 81/264* (2013.01); *B65D 81/266* (2013.01); *B01D 2253/106* (2013.01); *B01D 2253/108* (2013.01); *B01D 2253/11* (2013.01); *B01D 2253/116* (2013.01); *B01D 2253/1122* (2013.01); *B01D 2253/20* (2013.01); *B01D 2253/202* (2013.01); *B01D 2255/804* (2013.01); *B01D 2257/104* (2013.01); *B01D 2259/4525* (2013.01)

(58) Field of Classification Search
   CPC ............ B01D 53/261; B01D 2253/106; B01D 2253/108
   USPC .................................. 206/204; 264/523, 524
   See application file for complete search history.

(56) References Cited

U.S. PATENT DOCUMENTS

| | | |
|---|---|---|
| 4,486,481 A | 12/1984 | Heitkamp et al. |
| 4,668,442 A | 5/1987 | Lang |
| 4,842,920 A * | 6/1989 | Banai ............ B01J 19/30 210/150 |
| 5,217,616 A | 6/1993 | Sanyal et al. |
| 5,432,214 A | 7/1995 | Lancesseur |
| 5,911,937 A * | 6/1999 | Hekal ............ B01J 20/28014 206/204 |
| 6,221,492 B1 | 4/2001 | Moreau et al. |
| 6,280,504 B1 | 8/2001 | McHahon |
| 6,395,522 B1 | 5/2002 | DeFilippi et al. |
| 7,765,775 B2 | 8/2010 | DeFedericis |
| 2003/0040108 A1 | 2/2003 | Adams et al. |
| 2003/0153457 A1 | 8/2003 | Nemoto et al. |
| 2003/0235896 A1 | 12/2003 | Kallenbach et al. |
| 2004/0094635 A1* | 5/2004 | Harris ............ A61L 9/012 239/60 |
| 2005/0211099 A1 | 9/2005 | Doughty et al. |
| 2007/0182035 A1* | 8/2007 | Kavolik, Jr. ............ B01J 19/30 261/94 |
| 2008/0011163 A1 | 1/2008 | McClain |
| 2008/0202336 A1 | 8/2008 | Hofer et al. |
| 2011/0206569 A1 | 8/2011 | Rohde et al. |
| 2012/0006697 A1* | 1/2012 | Portier ............ B65D 23/02 206/204 |
| 2013/0168603 A1* | 7/2013 | Schicker ............ B01J 20/22 252/194 |

FOREIGN PATENT DOCUMENTS

| | | |
|---|---|---|
| GB | 2492370 A | 1/2013 |
| WO | WO2009047243 A1 | 4/2009 |

OTHER PUBLICATIONS

International Search Report dated Mar. 23, 2015 with respect to international application No. PCT/EP2014/078748.
European Examination Report dated Nov. 28, 2019 with respect to European Patent Application No. 14305020.1.
Amended Claims referenced in EPO Communication dated Nov. 28, 2019 with respect to European Patent Application No. 14305020.1.

* cited by examiner

ACTIVE ELEMENT, METHOD FOR MANUFACTURING THE SAME AND CONTAINER WITH ACTIVE ELEMENT

FIELD OF THE INVENTION

The invention relates to an active element which is intended to be placed inside a container for increasing the shelf life of substances which are sensitive to moisture, oxygen or other gases. Further the invention relates to a container comprising such an active element and a method for manufacturing such an active element.

PRIOR ART

In order to store moisture sensitive goods, these goods are commonly placed into a container that can be closed in a preferably moisture tight way. To further regulate the atmosphere in the interior space of such a container, active elements that can absorb moisture are placed inside the container alongside with the stored goods.

Generically, these active elements are canisters that are made in two pieces, a body and a cap, and filled with active agent particles or adsorbent particles. WO 2009/047243 discloses such an active canister.

In practice, however, and especially with regard to their usage together with containers for storing moisture sensitive goods, such canisters have several disadvantages.

Firstly, such active elements require numerous steps for their manufacture: after injection of the canister's body, the pieces have to be transferred to a filling unit where they have to be arranged in a specific orientation in order to be filled with the adsorbent particles. After that, a cap has to be precisely placed onto the opening of the canister's body and fixed to it.

Secondly, canisters comprising loosely packed active agent particles might potentially leak and a contamination of the goods stored in a container might occur. Such contamination can for instance result from an undesired opening of the canister due to an impairment of the attaching connection between the body and the cap of the canister. Such impairment can for instance result from a deformation during the filling procedure of the canister with the active agent particles or from a drop of the container onto a hard surface. Further, during the filling procedure, individual active agent particles can easily remain between the cap and the canister body thereby compromising its proper closure.

Similarly, permeable membranes that are often used to keep the active agent particles separate from the stored goods might get perforated, allowing powder or small pieces of active agent to escape. If said permeable membrane is fixedly attached to a canister body, for instance by welding resin components, the heat treatment necessary therefore can weaken the canister which compromises its integrity and permeability.

Further, canisters of the prior art are commonly rectangular or cylindrically shaped. Even if these canisters have a diameter fitting the size of the opening of the container, dispensing mechanisms associated with high-speed filling operations can lead to interference between the edge of the canister and the edge of the opening of the container. Such misfit inevitably will lead to a queuing in the filling procedure.

To overcome these problems and to facilitate an easier introduction of the canister in a container, U.S. Pat. No. 7,765,775 describes canisters with bevelled edges. However, even with bevelled edges, these cylindrical canisters require a defined orientation in order to be inserted into the containers.

SUMMARY OF THE INVENTION

Accordingly, the object of the present invention is to provide an easy to manufacture active element capable of trapping and/or releasing a gaseous or liquid substance that reduces or even eliminates the problem of leakage of active agent particles and can easily be dispensed into a container. This object is solved by an active element with the features of this disclosure, a method of manufacturing such an active element and a container with such an active element. Preferred embodiments follow form the other claims.

According to the invention, the active element comprises a solid body which is enveloped by an outer boundary surface, wherein the solid body consists of an active material adapted to trap and/or release a gaseous or liquid substance. The active element is characterized in that the outer boundary surface has an overall roundish, preferably round shape. Further, the active material according to the present invention comprises a polymer blend with at least one active agent that is adapted to trap and/or release a gaseous or liquid substance, especially water vapor or oxygen.

Being made of a polymer blend, the active material can be easily brought into the desired shape by means standard molding techniques such as injection molding. Further, this allows for a high degree of flexibility in terms of the shape of the active element and facilitates to form the active element in one piece.

The fact that the active element according to the invention "consists" of active material in other words means that it is entirely made of active material, preferably in one piece. "Active material" in this case refers to any kind of material that is made of or contains components that are adapted to trap and/or release a gaseous or liquid substance. Consisting of such active material, the active element can show good trap and/or release performance. In addition, the tedious procedure of filling active agent particles into a canister can be avoided. Furthermore, since the active element itself consists of an active material the problem of leaking canisters is eliminated. Further, since the active element according to the present invention has an overall roundish, preferably round shape, the introduction of the active element into containers is greatly facilitated, even if it is not exactly positioned in relation to the opening of the container.

In this context, it is stressed that in the present application the term "container" is intended to refer to a container for storing moisture sensitive goods like drugs, drug products, moisture sensitive strips or nutraceuticals within the interior space of the container. Compared to that the term "canister" relates to a shell or sachet constituting active elements according to the prior art, into which active agent particles are filled.

Preferably, in the overall roundish shape, the largest dimensions exceeds the smallest dimension by not more than 30%.

In the present invention, the term "outer boundary surface" relates to a contour which envelops the active element irrespective of potential recesses or walls that serve to increase the active surface of the active element. Thereby, the active surface is the total exchange surface of the active element between the active material and the surrounding atmosphere (e.g. inside the container).

Preferably, the total exchange surface of the active element with the surrounding atmosphere is greater than the outer boundary surface, preferably at least 1.5 times greater, and more preferably at least two times greater than the outer boundary surface.

The fact that the active surface is preferably greater than the outer boundary surface optimizes the absorption kinetic of the active element. The increased active surface enhances the trap and/or release properties of the active element and at the same time ensures a smaller size of the active element.

According to a preferred embodiment, the solid body of the active element has a plurality of intersecting walls, that are planar or curved, and/or at least two recesses that extend from the outer boundary surface towards the solid body; the at least two recesses do not form part of the solid body; wherein the active element further comprises corresponding walls separating neighboring recesses.

The term "recess" generally can be imagined as the resulting empty space that is left in the solid body, when a corresponding section or slice had been cut out from the solid body. Thereby, a corresponding "cut" would be performed starting from the outer boundary surface towards the solid body.

Generally, the walls can have any shape and can be in any geometric relation amongst each other, as long as the walls are inscribed into the outer boundary surface.

Due to the provision of walls and/or recesses, the active surface of the active element can be effectively increased without increasing the outer boundary surface.

Preferably, the walls of the active element are integrally formed. Since the active element according to the present invention consists of an active material adapted to trap and/or release a gaseous or liquid substance, it can be made in one-piece. This allows for a very simple and cheap manufacturing, and also prevents the risk of undesired disintegration of the active agent.

Preferably, the outer boundary surface has at least one axis of rotational symmetry and is more preferably of essentially spherical, ellipsoidal or ovoidal shape or is of cylindrical shape with beveled or rounded edges.

The spherical or ovoidal shape of the active element allows its introduction into the container without specific orientation of the active element. The spherical active element can be introduced in any orientation and only requires a global orientation but no orientation in any axial direction. Thus, the active element according to the present invention shows significant advantages in terms high-speed filling operations of active elements into a container.

In a preferred embodiment, the outer boundary surface is spherical.

Preferably, the active material comprises 5 to 80% by weight of active agent, more preferably 20 to 75%, and most preferably 50 to 70% by weight of active agent. The polymer blend can be a polyolefin based polymer, in particular polyethylene, polypropylene, or polystyrene or a biodegradable polymer, in particular a cellulose-based polymer or polylactic acid or an elastomer, in particular thermoplastic elastomers.

Preferably, the active agent can be a desiccating agent, an oxygen scavenger or a mixture thereof.

Preferably, the desiccating agent is a silica gel, a molecular sieve, clay, zeolites or a mixture thereof. The oxygen scavenger can be an iron-based oxygen scavenger, an organic oxygen scavenger, an enzymatic scavenger, an unsaturated polymer, or a mixture thereof.

The solid body of the active element can have multiple walls in order to increase the active surface between the active material forming the active element and the surrounding atmosphere. Thereby, the walls can be arranged in any manner.

In a preferred embodiment, the walls are substantially planar radial walls, which extend radially from one of the at least one axis of rotational symmetry towards the outer boundary surface of the active element.

The provision of radial walls has the advantage that the walls can be inscribed into the outer boundary surface in a very regular and defined manner. This further facilities the filling procedure of the active element into the container and helps to optimally utilize the volume defined by the outer boundary surface. A further advantage of the radial walls extending radially from one of the at least one axes of rotational symmetry towards the outer boundary surface is that an extremity of this axis of rotational symmetry can be used as injection point for the manufacture of the active element.

Preferably, the radial walls are spaced in regular angular intervals around the axis of rotational symmetry from which the radial walls extend. Thereby, the number of radial walls preferably is 4 to 12 and more preferably 6 to 12 and still more preferably 8.

The solid body of the active element according to the preferred embodiment may further comprise at least one additional wall that is perpendicular to the radial walls.

The additional walls further increase the active surface and the amount of active agent contained in the active element without increasing the bulk of the active element. Furthermore, they contribute to the stiffness of the different radial walls of the active element.

According to a preferred embodiment, the solid body of the active element according to the present invention further comprises a peripheral wall that extends from the outer boundary surface of the active element towards the solid body. Thereby, the peripheral wall preferably extends uniformly along the circumferential direction around the axis of rotational symmetry from which the radial walls extend.

On the one hand, the peripheral wall further increases the active surface and the amount of active agent contained in the active element. On the other hand, the peripheral wall contributes to the overall stability of the active element. Further, since the peripheral surface extends from the outer boundary surface, it limits the size of the recesses, which is beneficial for the dispensing procedure of the active element into a container, as this limits the probability of jamming due to interference of one of the recesses with the opening of the container.

The peripheral wall preferably is essentially curved and may have a lateral extension of 25% to 50%, and preferably of 33%, of the length of the axis of rotational symmetry from which the radial walls extend. Further, the peripheral wall can be integrally formed with any of the walls. Preferably the axis of rotational symmetry of the peripheral wall is concentric with the axis of rotational symmetry from which the radial walls extend.

A suchlike configured active element having a peripheral wall the axis of rotational symmetry of which is concentric with the over axis of rotational symmetry, is ideally suited to be manufactured in a molding procedure, especially by means of injection molding.

Preferably, one of the at least one additional walls is concentric with the center of mass of the peripheral wall.

In other words this means that the axis of rotational symmetry of the additional wall is concentric with the axis of rotational symmetry of the peripheral wall.

According to such an arrangement, the manufacturing of the active element by means of injection molding can be facilitated.

The active element may further contain a concentric wall, the symmetry axis of which is concentric with the axis of rotational symmetry of the active element. When viewed from the direction of the axis of rotational symmetry, the diameter of the concentric is smaller than the diameter of the peripheral wall. At a given diameter and positioning of the concentric wall along the axis of rotational symmetry of the active element, the upper limit for the lateral extension of the concentric wall along the axis of rotational symmetry of the active element follows from the requirement that also the concentric wall (like any other wall) has to be contained within the outer boundary surface of the active element.

The thickness of any of the walls, comprising the radial walls, the additional walls, the peripheral walls, the concentric wall preferably is at most 4 mm and more preferably 0.5 mm to 3 mm and most preferably 0.7 mm to 2 mm. By modifying the thickness of the walls, it is possible to advantageously affect the absorption kinetics of the active element. The greater the thickness, the slower is the kinetic of gas exchange in the deeper layers of the walls.

In another preferred embodiment, the active element further has ribs on any of the walls, comprising the radial walls, the additional walls, the peripheral walls, and the concentric walls. The ribs are preferably elongated with a maximal length corresponding to the lateral extension of the peripheral wall and may have a triangular or rounded cross-sectional surface. The ribs serve to further increase the amount of active material and the active surface without increasing the bulk of the active element. Furthermore, the ribs provide additional contact points for removing the active element from a mould during the manufacturing of the active element.

Specifically, the method of manufacturing an active element according present invention is characterized in that the solid body of the active element is manufactured in one piece by injection molding of the active material. Thus, the active element according to the present invention fulfils the preconditions for a quick and effective way of manufacturing.

In another embodiment, the active element can be injection molded from two or more different active materials. Such an active element allows to combine absorption or releasing properties toward different gaseous substances. For example some walls can comprise a desiccating agent whereas other walls can comprise an oxygen scavenger or an odor absorbing agent. Such an active element can be manufactured by any conventional technology of multi-material molding like for example bi-injection, insert molding, or the like.

The container for stored products according to the invention comprises a container body having an interior space, a cap adapted to seal the interior space of the container body substantially airtight, wherein the container further comprises: an active element according to the present invention being contained within the interior space.

The container according to the present invention preferably refers to pharmaceutical containers for storing moisture sensitive goods like drug products, moisture sensitive strips or nutraceuticals but is not limited to this application. By adding an active element into the interior space of the container, an active headspace management of the container can be achieved.

SHORT DESCRIPTION OF THE DRAWINGS

In the following several embodiments of the invention will be described in more detail with reference to the drawings. In the drawings.

DETAILED DESCRIPTION OF THE PREFERRED EMBODIMENTS

In the following, preferred embodiments of the invention are shown with respect to the figures.

Figure 1:
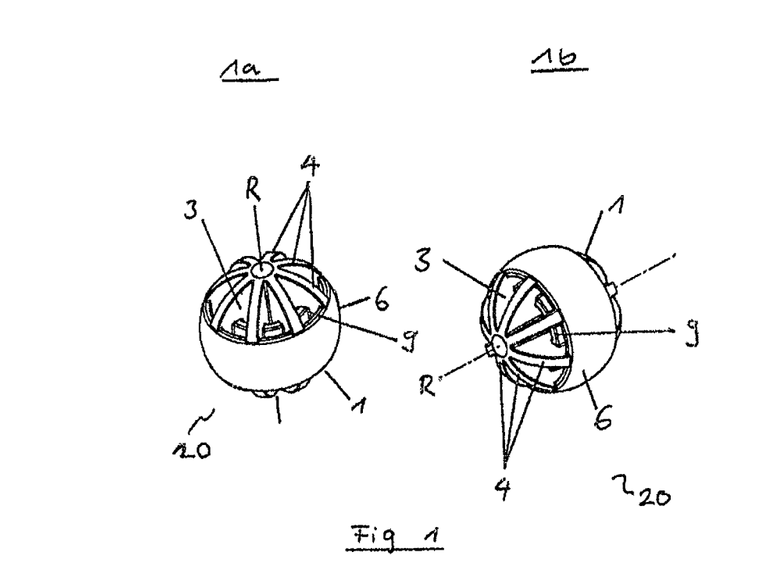
FIGS. 1a and 1b are three dimensional views of a preferred embodiment according to the present invention showing a spherical active element.
Figure 2:
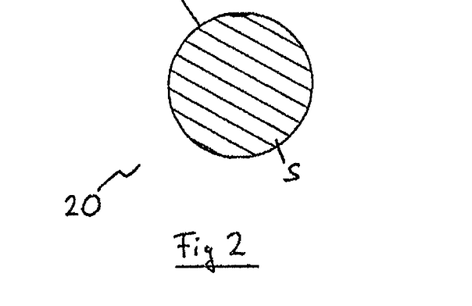
FIG. 2 is schematic representation of the silhouette of the active element according to the preferred embodiment.

FIGS. 1a and 1b show an active element 20 according to a first preferred embodiment. The active element 20 consists of a solid body 1 that is enveloped by an outer boundary surface S. The silhouette of this outer boundary surface S is shown in FIG. 2. As can be inferred from FIG. 2, the term outer boundary surface relates to a contour which envelopes the active element 20 irrespective of recesses 3 or the arrangement of walls 4, 5, 6, 9 that serve to increase the active surface of the active element 20.

In the case of the active element 20 according to the first embodiment, the solid body 1 has a plurality of walls 4, 5, 6, 9 that separate neighbouring recesses 3. The recesses 3 do not form part of the solid body 1.

Figure 3:
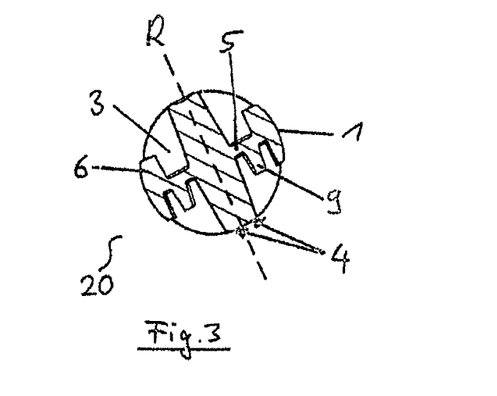
FIG. 3 is a cross-section view of the active element according to the preferred embodiment taken along the axis of rotational symmetry.

In the first embodiment, the outer boundary surface S is substantially spherical. It envelopes eight radial walls 4 that are planar and extend radially from one axis of rotational symmetry R towards the outer boundary surface of the active element. The radial walls 4 are spaced in regular angular intervals along the axis of rotational symmetry R, from which the radial walls 4 extend. Further, the active element comprises an additional wall 5 that is perpendicular to the radial walls 4 (FIG. 3).

To further increase the stiffness and the active surface of the active element 20, the solid body 1 of the active element 20 further has a peripheral wall 6 that extends from the outer boundary surface S of the active element 20 towards the solid body 1. More specifically, the peripheral wall 6 uniformly extends along the circumferential direction with respect to the axis of rotational symmetry R. Hence, the peripheral wall is essentially curved. The lateral extension of the peripheral wall 6 with respect to the axis of rotational symmetry R can vary. In the present preferred embodiment the extension of the peripheral wall 6 amounts to 33% of the length of the axis of rotational symmetry. Further, the additional wall that was defined to be perpendicular to the radial walls 4 is concentric with the centre of mass of the peripheral wall 6. In other words, the additional wall lies in the plane of symmetry of the peripheral wall 6 and is perpendicular to the axis of rotary symmetry.

In this embodiment, the active element further comprises a concentric wall 9. As can be seen from FIG. 3, the axis of rotational symmetry of the concentric wall 9 is concentric with the axis of symmetry R of the active element 20 and with the axis of rotational symmetry of the peripheral wall 6. When viewed from the direction of the axis of symmetry R, the concentric wall 9 has an overall smaller diameter than the peripheral wall 6. In the present embodiment the concentric wall extends from one side of the additional wall 5. However, the concentric wall can also extend from both sides of the additional wall.

Altogether the walls 4, 5, 6, 9 of the solid body 1 of the active element 20 according to the first preferred embodiment are made up of the radial walls 4, the additional walls 5, the peripheral wall 6, and the concentric wall 9.

The thickness of the walls 4, 5, 6, 9 preferably is at most 4 mm and more preferably 0.5 mm to 3 mm and most preferably 0.7 mm to 2 mm.

In a more particular example, the wall thickness of the active element is as follows:
- the thickness of radial walls 4 varies from 2.3 mm at parting line to 1.7 mm at the edge (draft angle included);
- the thickness of peripheral wall 6 varies between 2.1 mm at the intersection with wall 5 and 0.8 mm at upper and lower edges; and
- the thickness of additional wall 5 is 1.6 mm.

Figure 4:
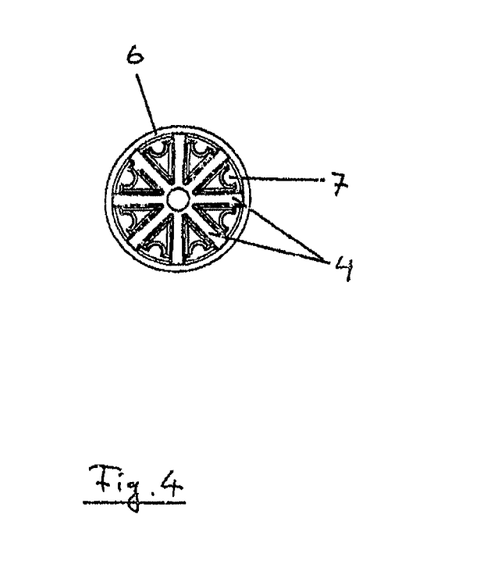
FIG. 4 is a top view of the active element according to the preferred embodiment.

As shown in FIG. 4, the peripheral wall 6 further has ribs 7 that are elongated and have a maximal length that corresponds to the lateral extension of the peripheral wall. The cross-sectional surface of these ribs 7 in this first embodiment is a half circle.

All these structural features, the radial walls 4, the additional wall 5, the peripheral wall 6, the concentric wall 9, and the ribs 7 serve to increase the active surface of the active element 20 without increasing its bulk. Thereby, the active surface is defined as the entirety of exchange surfaces at which the active material is exposed to the surrounding atmosphere. Due to the existence of multiple walls 4, 5, 6, 9 and ribs 7 the effective active surface is significantly larger than the outer boundary surface S. In the case of the spherical active element shown in FIG. 1, the active surface amounts to approximately 3200 mm$^2$ (with ribs), whereas the outer boundary surface S is approximately 1500 mm$^2$ (for a sphere with a diameter of approximately 22 mm).

The geometry of the active element 20 and specifically the arrangement of the walls 4, 5, 6, 9 enables that the active element is formed in one piece.

The active material, the walls 4, 5, 6, 9 of the active element 20 consist of, comprises a polymer blend with at least one active agent that is adapted to trap and/or release a gaseous or liquid substances, especially water vapour or oxygen. Thereby the active material preferably comprises 5 to 80% by weight of active agent, more preferably 20 to 75%, and most preferably 50 to 70% by weight of active agent. Concerning the polymer blend that forms the basis of the active material, one can in principle choose from a wide variety of polymers. Examples are polyolefin based polymers, in particular polyethylene, polypropylene, or polystyrene or a biodegradable polymer, in particular a cellulose-based polymer or a polylactic acid or an elastomer in particular thermoplastic elastomers. Similarly, the active agent can be any of: a desiccant agent, an oxygen scavenger, active carbon, sent releasing agent or mixtures thereof. As regards the desiccant agent, silica gels or molecular sieve, clay, zeolites or a mixture thereof have proven effective. The oxygen scavenger can be an iron based oxygen scavenger an organic oxygen scavenger, an enzymatic scavenger, an unsaturated polymer, or a mixture thereof.

Figure 5A:
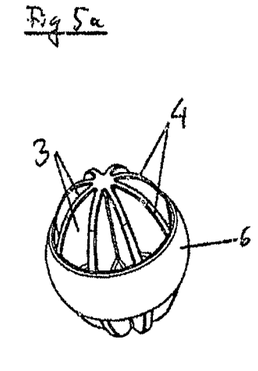
FIGS. 5a and 5b are three dimensional view of a second preferred embodiment of the present invention showing an ellipsoidal active element.
Figure 5B:
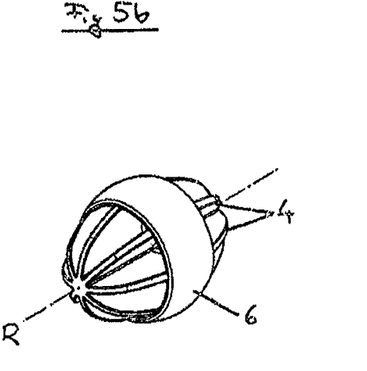

Of course, the active element 20 described in the first embodiment is not limited to a spherical outer boundary surface S. As shown in FIGS. 5a and 5b according to another preferred embodiment, the active element 20 can also be of ellipsoidal shape. In this preferred embodiment, the solid body 1 of the active element 20 also comprises multiple walls that can be further subdivided into eight radial walls 4, one additional wall 5, perpendicular to the radial walls, and one peripheral wall 6 extending along the circumferential direction around the axis of rotational symmetry R. Although the ribs 7 have been omitted in this embodiment, they may as well be included on any of the walls.

Even without the ribs, however, the ellipsoidal active element 20 according to the second preferred embodiment has an active surface of about 4300 mm$^2$ at an outer boundary surface S of about 1800 mm$^2$. The short axis of the ellipsoid is approximately 36 millimetres long and the long axis is approximately 66 millimetres long. The thickness of the wall again is approximately one millimetre.

Figure 6A:
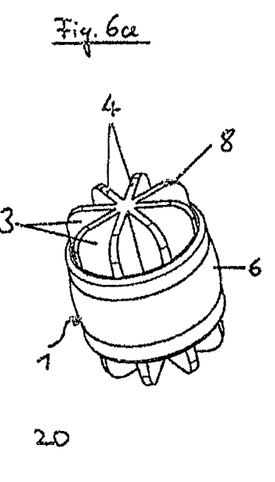
FIGS. 6a and 6b are three dimensional view of a third preferred embodiment of the present invention showing a cylindrical active element.
Figure 6B:
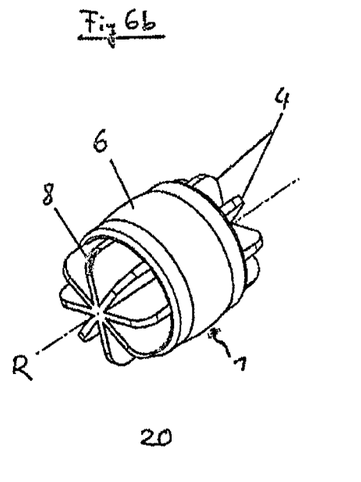

In yet a third preferred embodiment, the active element can also have an overall cylindrical shape into which the walls 4, 5, 6, 9 are inscribed. Again, the solid body 1 of the active element 20 altogether has eight radial walls 4 that extend from the axis of rotational symmetry R towards the outer boundary surface. It further has a perpendicular wall 5 and a peripheral wall 6. Together the radial walls 4, the additional wall 5 and the peripheral wall 6 constitute the walls of the solid body 1 of the active element 20. To facilitate an easier insertion of the active element into a container, the edges of the radial walls 4 are rounded edges 8. The cylindrical active element shown in FIGS. 6a and 6b has an active surface of approximately 5800 mm$^2$ with an outer boundary surface of about 2400 mm$^2$ (the diameter of the cylinder is 23 mm; the axis length is 28 mm).

Apart from the shape of the outer boundary surface S and the ribs 7 that have been omitted in the second and third preferred embodiment, the active elements 20 shown in the second and third preferred embodiment correspond to the active element 20 of the first preferred embodiment. In particular, they also consist of an active material which may have a composition as described above.

Further, all active elements 20 described so far have in common that they are ideally suited to be manufactured in one piece. Specifically, they are optimally adapted to be injection moulded, in particular by using an Injection Moulding Compounder (IMC). For example, the ribs 7 provide additional contact points when the injection moulded active element 20 is to be released from a mould. Further, the axis of rotational symmetry R can be used as injection channel for the manufacture of the active element. Accordingly, a preferred way of manufacturing the active elements 20 according to the present invention is an injection moulding technique where the active material is injected into a mould to form the active element. Furthermore, the internal side of the peripheral wall 6 is preferably parallel to the axis of rotational symmetry R or slightly inclined so as to facilitate the de-moulding of this active element 20
(even in a roundish shape). The same preferably applies for the internal and external sides of the concentric wall 9 (as shown in FIG. 3) and for the external side of the core constituted by the intersections of the radial walls 4.

In general, the blending of the active agents into a polymer to form the active material can be operated with the moulding of the active element by using a single equipment. Hence, the active element is obtained from a single process step.

Accordingly, the active elements 20 of the present invention can readily be formed by an injection moulding technique that enables a simple and cheap manufacturing. At the same time, since the active elements 20 are formed in one piece, the risk of undesired opening and leakage of the active agent is prevented.

Another advantage of the active element is that for an equivalent weight of active agent, the active element shows a smaller bulk than usual canisters that contain a certain headspace within.

A further advantage of the active element is that the weight of active agent it contains is more reproducible than the weight of active agent inserted in usual canisters as differences can be observed a canister to another, for example due to losses or defaults during filling.

Figure 7:
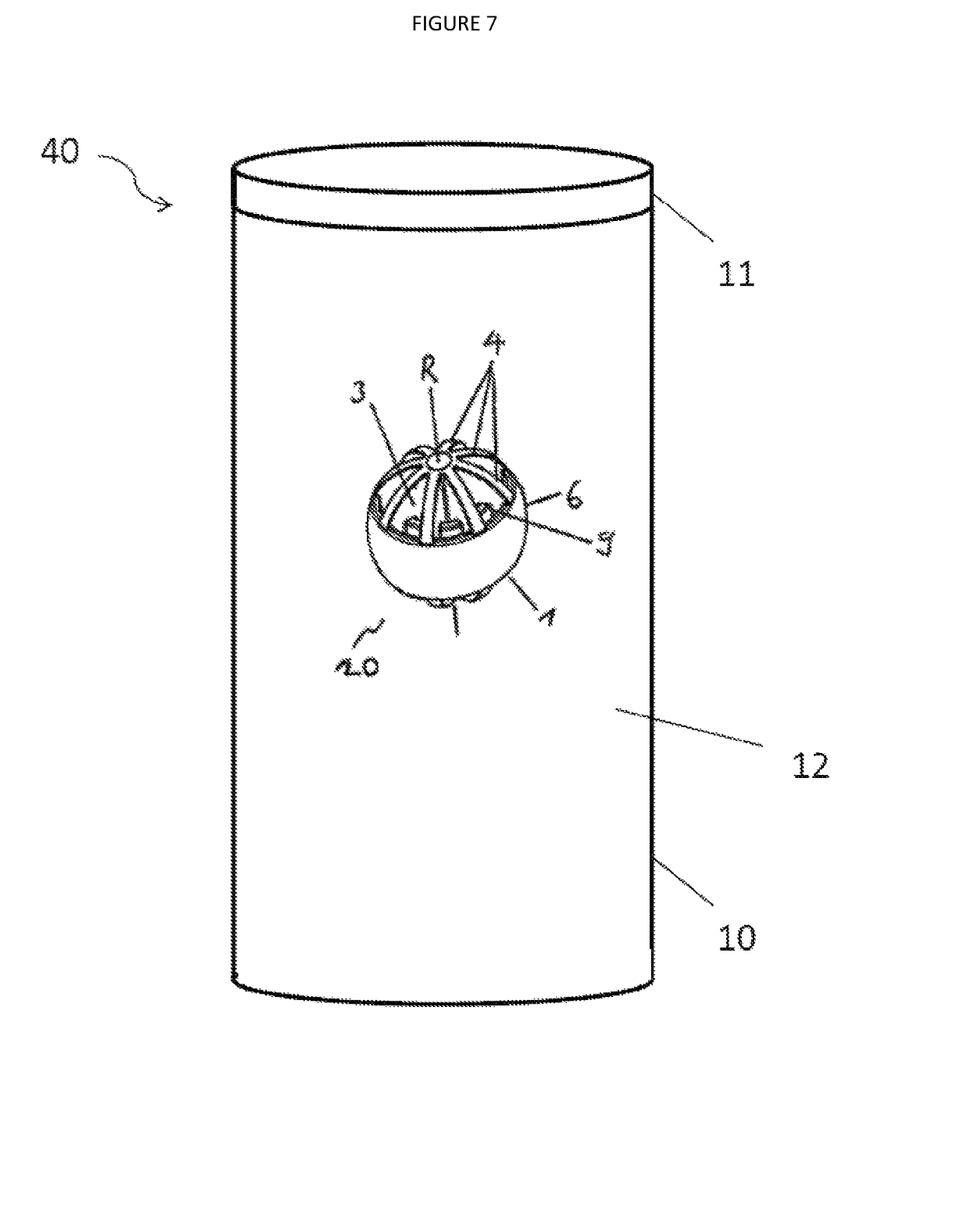
FIG. 7 is a container enclosing the active element of FIG. 1.

Following the above, a container 40 for stored products comprises a container body 10 having an interior space 12 and a cap 11 that is adapted to seal the interior space 12 of the container body 10 in an airtight way. The active elements 20 according to the present invention can now be provided in either the cap 11 or the interior space of the container body 10. See FIG. 7.

The invention claimed is:

1. An active element comprising a solid body which is enveloped by an outer boundary surface (S), wherein
the solid body comprises an active material adapted to trap and/or release a gaseous or liquid substance;
characterized in that,
the outer boundary surface (S) has an overall roundish shape; and
the active material comprises a polymer blend with at least one active agent that is adapted to trap and/or release a gaseous or liquid substance, and wherein
the solid body further comprises a plurality of intersecting walls, wherein the walls are planar or curved,
wherein the thickness of any of the walls comprising radial walls is at most 4 mm, and
wherein at least two recesses extend from the outer boundary surface towards the solid body; wherein the at least two recesses do not form a part of the solid body; and wherein neighboring recesses are separated by walls.

2. The active element according to claim 1, wherein the active material comprises 5 to 80% by weight of the at least one active agent.

3. The active element according to claim 1, wherein
the active agent is selected from the group consisting of a desiccating agent, an oxygen scavenger and a mixture thereof.

4. The active element according to claim 1, wherein
a total exchange surface of the active element with a surrounding atmosphere is greater than the outer boundary surface(s).

5. The active element according to claim 1, wherein the walls are integrally formed.

6. The active element according to claim 1, wherein the outer boundary surface (S) has at least one axis of rotational symmetry (R), wherein the shape of which is selected from the group consisting of essentially spherical, ellipsoidal, ovoidal shape and a cylindrical shape with beveled or rounded edges.

7. The active element according to claim 1, wherein
the walls are substantially planar radial walls, which extend radially from one of the at least one axis of rotational symmetry (R) towards the outer boundary surface(s) of the active element.

8. The active element according to claim 7, wherein the solid body of the active element further comprises at least one additional wall that is perpendicular to the radial walls.

9. The active element according to claim 1, wherein the peripheral wall that extends from the outer boundary surface (S) of the active element towards the solid body.

10. The active element according to claim 9, wherein the active element on any of the walls, comprising radial walls, additional walls, and peripheral wall, further comprises ribs.

11. The active element of claim 1, wherein the gaseous or liquid substance trapped and/or released is water vapor and/or oxygen.

12. The active element according to claim 1, wherein its outer boundary surface (S) has an overall round shape.

13. The active element according to claim 3, wherein the desiccating agent is selected from the group consisting of a silica gel, a molecular sieve, clay, zeolites and a mixture thereof.

14. The active element according to claim 3, wherein the oxygen scavenger is selected from the group consisting of an iron-based oxygen scavenger, an organic oxygen scavenger, an enzymatic scavenger, an unsaturated polymer, and a mixture thereof.

15. The active element according to claim 4, wherein the total exchange surface of the active element with the surrounding atmosphere is at least 1.5 times greater than the outer boundary surface.

16. The active element of claim 1, wherein the thickness of the walls is from 0.5 mm to 3 mm.

17. The active element of claim 1, wherein the thickness of the walls is from 0.7 mm to 2 mm.

18. A container for stored products comprising
a container body having an interior space;
a cap adapted to seal the interior space of the container body substantially airtight, wherein the container further comprises:
the active element according to claim 1 being contained within the interior space therein.

19. A method of manufacturing the active element according to claim 1 comprising injection molding the solid body of the active element in one piece.

* * * * *